United States Patent
Erden et al.

(10) Patent No.: US 7,982,994 B1
(45) Date of Patent: Jul. 19, 2011

(54) MULTI-LEVEL RECORDING ON SHINGLED COHERENT MAGNETIC MEDIA

(75) Inventors: Mehmet Fatih Erden, St. Louis Park, MN (US); Mourad Benakli, Bloomington, MN (US); Walter Richard Eppler, Cranberry Township, PA (US)

(73) Assignee: Seagate Technology, LLC, Cupertino, CA (US)

( * ) Notice: Subject to any disclaimer, the term of this patent is extended or adjusted under 35 U.S.C. 154(b) by 0 days.

(21) Appl. No.: 12/778,697

(22) Filed: May 12, 2010

(51) Int. Cl.
*G11B 5/02* (2006.01)
(52) U.S. Cl. .................................................. 360/55
(58) Field of Classification Search ............... 360/55, 360/39, 40, 48, 58, 69, 75, 77.01, 77.02, 360/77.08, 78.04; 711/172
See application file for complete search history.

(56) References Cited

U.S. PATENT DOCUMENTS

| | | | | |
|---|---|---|---|---|
| 3,601,702 A * | 8/1971 | Lender | ............ | 714/810 |
| 3,911,483 A * | 10/1975 | Kihara et al. | ............ | 386/222 |
| 4,754,481 A * | 6/1988 | Feggeler | ............ | 380/41 |
| 4,817,035 A * | 3/1989 | Timsit | ............ | 714/54 |
| 5,229,895 A * | 7/1993 | Schwarz et al. | ............ | 360/77.12 |
| 6,025,970 A * | 2/2000 | Cheung | ............ | 360/77.08 |
| 6,122,435 A * | 9/2000 | Izawa et al. | ............ | 386/241 |
| 6,275,350 B1 * | 8/2001 | Barndt | ............ | 360/77.12 |
| 6,539,514 B1 * | 3/2003 | Bartlett | ............ | 714/761 |
| 6,760,184 B1 * | 7/2004 | Cunningham | ............ | 360/77.08 |
| 6,967,810 B2 | 11/2005 | Kasiraj et al. | | |
| 7,372,656 B2 | 5/2008 | Satoh et al. | | |
| 7,440,221 B2 | 10/2008 | Tsuchinaga et al. | | |
| 7,490,212 B2 | 2/2009 | Kasiraj et al. | | |
| 2006/0227449 A1 | 10/2006 | Che et al. | | |
| 2007/0047122 A1 | 3/2007 | Czarnecki et al. | | |
| 2007/0223132 A1 | 9/2007 | Tsuchinaga | | |
| 2008/0068753 A1 * | 3/2008 | Biskeborn et al. | ............ | 360/130.21 |
| 2008/0080082 A1 | 4/2008 | Erden et al. | | |
| 2008/0316639 A1 | 12/2008 | Tang et al. | | |
| 2010/0033865 A1 | 2/2010 | Hashimoto et al. | | |

* cited by examiner

*Primary Examiner* — Fred Tzeng
(74) *Attorney, Agent, or Firm* — David C. Bohn; Westman, Champlin & Kelly, P.A.

(57) ABSTRACT

A data storage system includes recording media with a shingled track pattern of multiple data tracks in which mapped data bits are recorded. The mapped data are coherently aligned with one another across the multiple data tracks. A read head has an effective read head width that extends across the multiple data tracks and that is aligned to coherently read the mapped data bits. A read head output includes a non-binary multi-level amplitude summation of the mapped data bits.

20 Claims, 17 Drawing Sheets

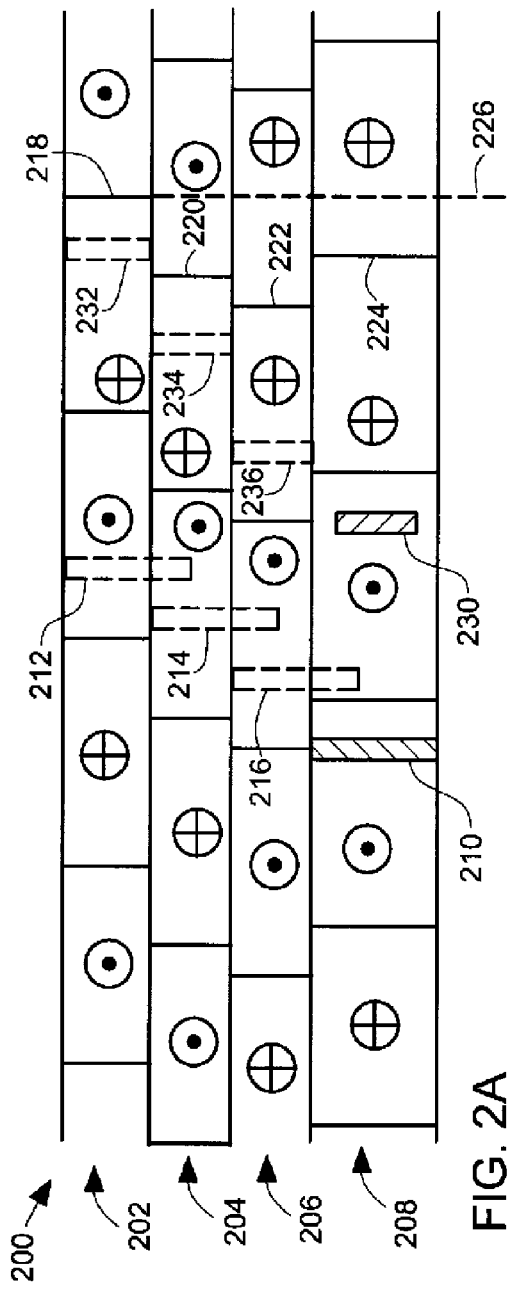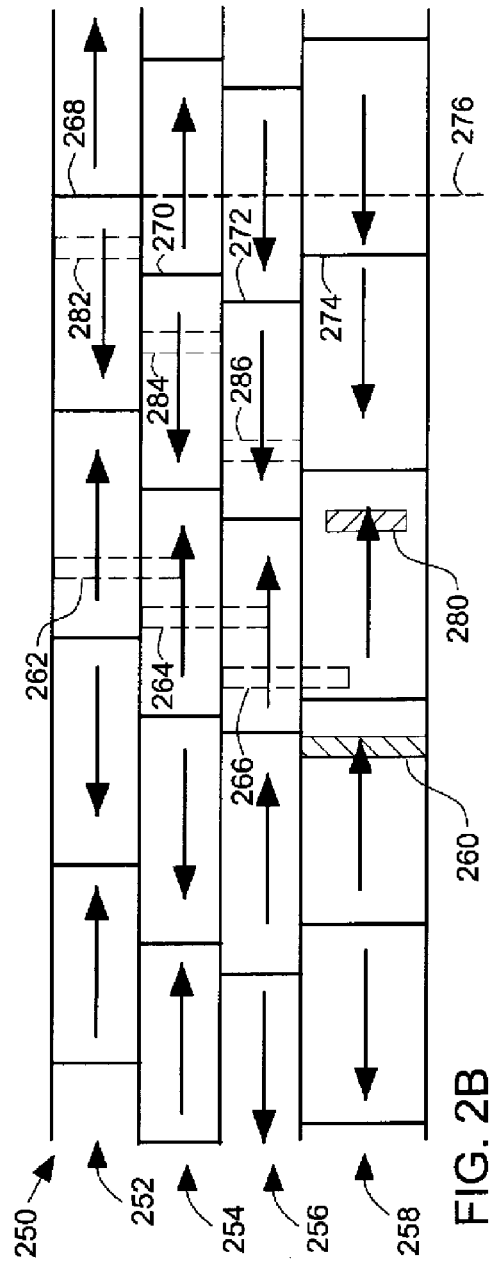

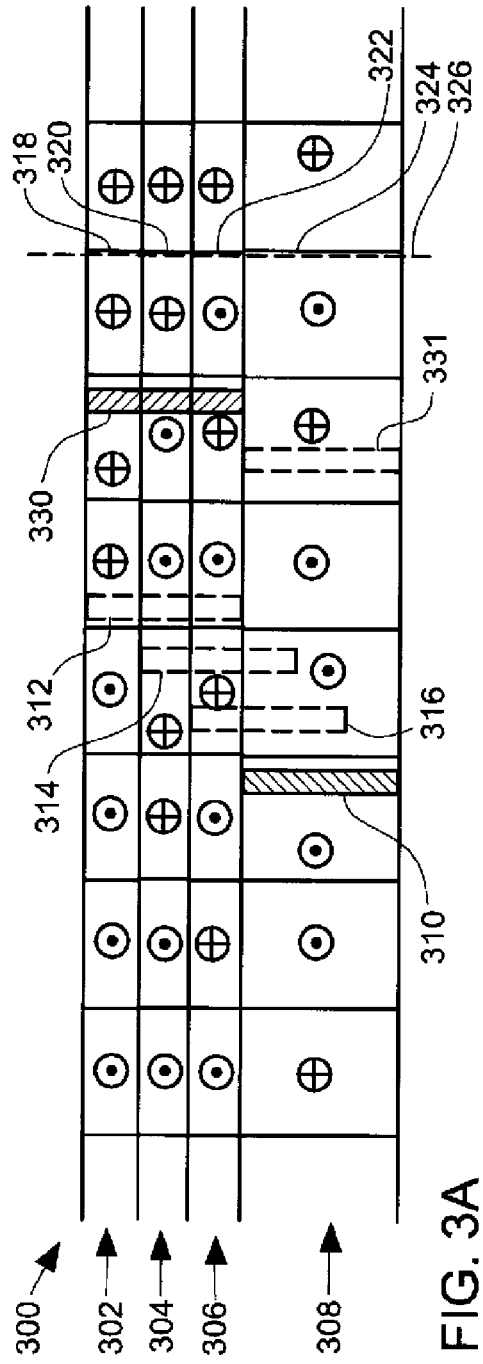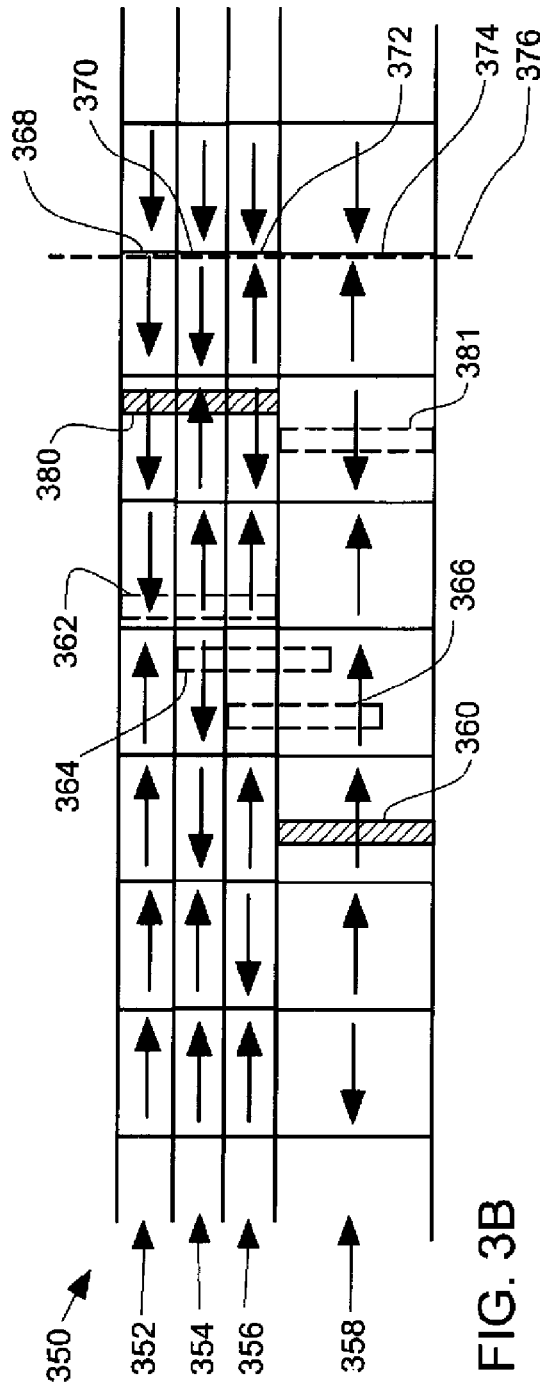
FIG. 3A
FIG. 3B

MULTI-LEVEL RECORDING ON SHINGLED COHERENT MAGNETIC MEDIA

BACKGROUND OF THE INVENTION

Tracks on magnetic data storage media are read using a read head. There is a desire to increase areal density (AD) of data stored on magnetic media by providing narrower track widths. However, as track widths decrease, the read width of read heads also decreases in order to avoid adjacent track interference. As the read head width decreases, it becomes increasingly costly and complex to manufacture read heads.

Embodiments of the present invention provide solutions to these and other problems, and offer other advantages over the prior art.

SUMMARY OF THE INVENTION

Disclosed is a data storage system. The data storage system comprises recording media. The recording media includes a shingled track pattern that includes a relatively wider track, and relatively narrower multiple data tracks.

Mapped data bits are recorded in the multiple data tracks. The mapped data bits are coherently aligned with one another across the multiple data tracks.

The data storage system comprises a read head. The read head has an effective read head width that extends across the multiple data tracks. The read head is aligned to coherently read the mapped data bits.

The read head has a read head output. The read head output comprises a non-binary multi-level amplitude summation of the mapped data bits.

Other features and benefits that characterize embodiments of the present invention will be apparent upon reading the following detailed description and review of the associated drawings.

BRIEF DESCRIPTION OF THE DRAWINGS

FIG. 2A illustrates non-coherent, shingled tracks on perpendicular magnetic media.

FIG. 2B illustrates non-coherent, shingled tracks on longitudinal magnetic media.

FIG. 3A illustrates coherent, shingled tracks on perpendicular magnetic media.

FIG. 3B illustrates coherent, shingled tracks on longitudinal magnetic media.

(FIG. 13).

DETAILED DESCRIPTION OF ILLUSTRATIVE EMBODIMENTS

The present disclosure relates to data systems, and particularly to data storage systems that implement or utilize recording media that includes a shingled track pattern. In accordance with certain aspects, multiple data tracks are written in a partially-overlapping shingled pattern, with each successive track overwriting a portion of the previous track. The data bits in each of a set of multiple shingled data tracks can be coherently mapped (for example, by aligning bit transitions) so that a read head can be positioned to coherently read multiple tracks in a single pass as non-binary multi-level data. Multi-level encoding and decoding schemes may be implemented to resolve a multi-bit signal from the multilevel data. In certain aspects, knowledge of the sensitivity profile of the read head may also be used to resolve a multi-bit signal from the multi-level read data.

Figure 1:
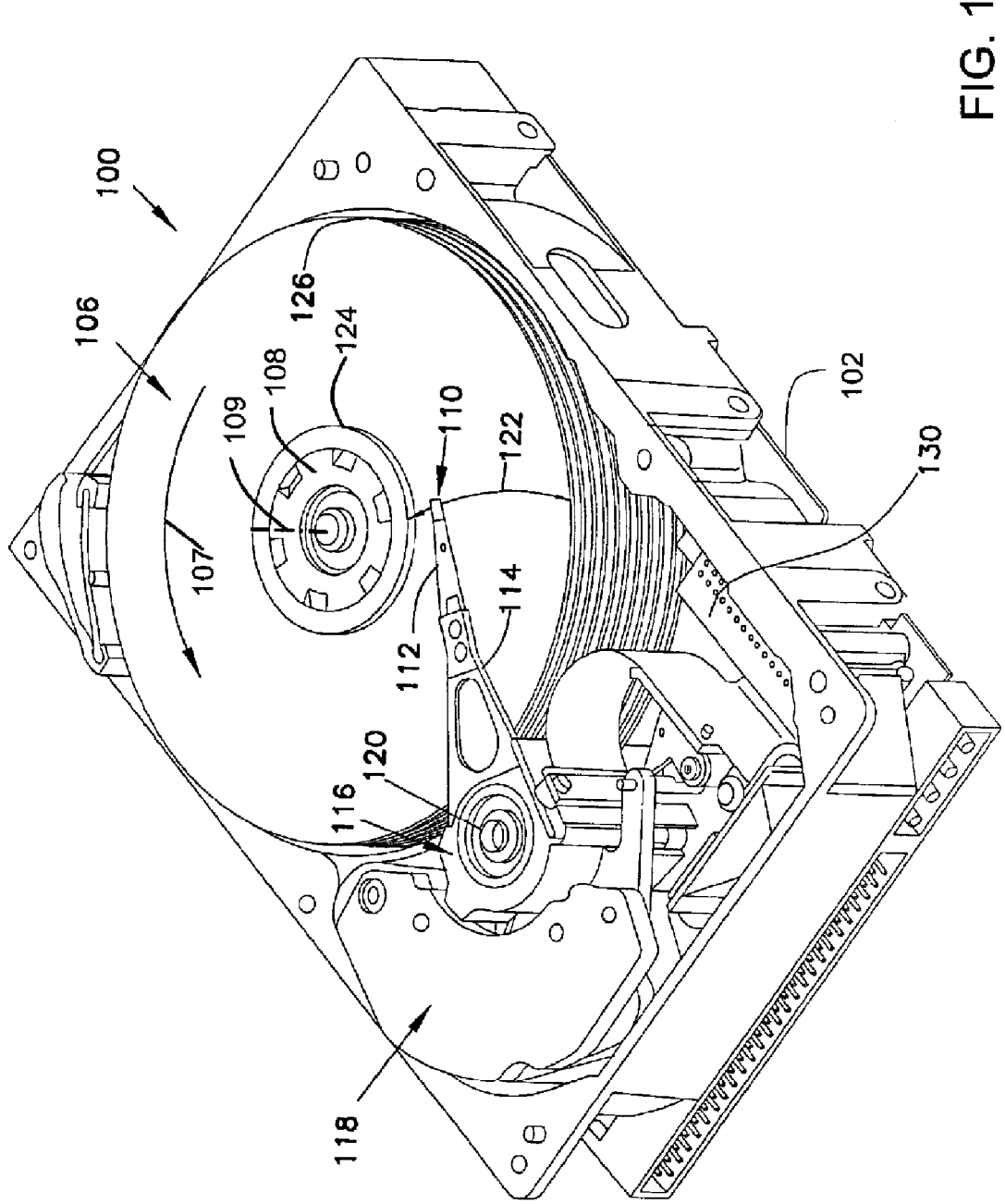
FIG. 1 is an oblique view of a disc drive.

FIG. 1 is an oblique view of a disc drive 100 in which embodiments of the present invention are useful. Disc drive 100 includes a housing with a base 102 and a top cover (not shown). Disc drive 100 further includes a disc pack 106, which is mounted on a spindle motor (not shown) by a disc clamp 108. Disc pack 106 includes a plurality of individual discs, which are mounted for co-rotation about central axis 109 in a direction indicated at 107. Each disc surface has an associated disc head slider 110 which is mounted to disc drive 100 for communication with the disc surface. The disc surface comprises coherent, shingled magnetic media as described in more detail below in connection with FIGS. 3A, 3B. In the example shown in FIG. 1, sliders 110 are supported by suspensions 112 which are in turn attached to track accessing arms 114 of an actuator 116. The actuator shown in FIG. 1 is of the type known as a rotary moving coil actuator and includes a voice coil motor (VCM), shown generally at 118. Voice coil motor 118 rotates actuator 116 with its attached heads 110 about a pivot shaft 120 to position heads 110 over a desired data track along an arcuate path 122 between a disc inner diameter 124 and a disc outer diameter 126. Voice coil motor 118 is driven by servo electronics 130 based on signals generated by heads 110 and a host computer (not shown).

FIG. 2A illustrates a portion of perpendicular magnetic media 200 recorded on a spinning disc. The portion of magnetic media includes circular recorded tracks 202, 204, 206, 208 that are recorded by a recording head 210 in an overlapping manner referred to as "shingled". Only a small length of each track 202, 204, 206, 208 is illustrated in FIG. 2A. Track 202 is recorded with the recording head 210 in a radial position 212. Track 204 is recorded with the recording head 210 in a radial position 214. Track 206 is recorded with the recording head 210 in a radial position 216. Track 208 is recorded with the recording head 210 in a radial position as shown in FIG. 2A.

In FIG. 2A, the tracks 202, 204, 206, 208 are recorded with bits that have either a magnetic +1 state (logical 0) with magnetic flux having an upward direction relative to the disc surface, or a magnetic −1 state (logical 1) with magnetic flux having a downward direction relative to the disc surface. In FIG. 2A, a bit with the magnetic +1 state is marked by the symbol ⊙, and a bit with the magnetic −1 state is marked by the symbol ⊕.

In FIG. 2A, the tracks 202, 204, 206, 208 have bit transitions along a track length between bits such as an exemplary bit transition 218 on the track 202, a bit transition 220 on the track 204, a bit transition 222 on the track 206, and a bit transition 224 on the track 208. As illustrated in FIG. 2A, the bit transitions 218, 220, 222, 224 do not line up with one another along a radial line 226. The bit transitions 218, 220, 222, 224 occur at random locations along the lengths of the tracks. While there may be occasional random alignment between bit transitions, there is no coherent control of locations of bit transitions in FIG. 2A.

Spacings between centers of tracks 202, 204, 206, 208 are smaller than an effective width of the write head 210, and as successive tracks are written, a portion of a width of an earlier track is written over by the next successive track. The tracks overlap. The track 202 is written first. The track 204 overwrites a portion of the track 202. The track 206 overwrites a portion of the track 204. The track 208 overwrites a portion of the track 206. This process of overwriting is referred to as shingling. A read head 230 is narrower than the write head 210. The read head 230 has a small enough read width to be able to read an overwritten shingled track such as tracks 202, 204, 206. The read head 230 is aligned for reading tracks 202, 204, 206, 208 at locations 232, 234, 236, and as shown at 230 respectively.

The process of shingling provides narrower track widths and increases areal density. The read width of the read head 230 however becomes very narrow, and the read head 230 becomes increasingly difficult to manufacture because of the extremely small read width required.

FIG. 2B illustrates a portion of longitudinal magnetic media 250 recorded on a spinning disc. The portion of magnetic media includes circular recorded tracks 252, 254, 256, 258 that are recorded by a recording head 260 in an overlapping manner referred to as "shingled". Only a small length of each track 252, 254, 256, 258 is illustrated in FIG. 2B. Track 252 is recorded with the recording head 260 in a radial position 262. Track 254 is recorded with the recording head 260 in a radial position 264. Track 256 is recorded with the recording head 260 in a radial position 216. Track 258 is recorded with the recording head 260 in a radial position as shown in FIG. 2B.

In FIG. 2B, the tracks 252, 254, 256, 258 are recorded with bits that have either a magnetic +1 state with magnetic flux having an forward direction relative to the disc rotation, or a magnetic −1 state with magnetic flux having a backward direction relative to the disc rotation. In FIG. 2B, a bit with the magnetic +1 state is marked by the symbol →, and a bit with the magnetic −1 state is marked by the symbol ←.

In FIG. 2B, the tracks 252, 254, 256, 258 have bit transitions between bits such as an exemplary bit transition 268 on the track 252, a bit transition 270 on the track 254, a bit transition 272 on the track 256, and a bit transition 274 on the track 258. As illustrated in FIG. 2B, the bit transitions 268, 270, 272, 274 do not line up with one another along a radial line 276. The bit transitions 268, 270, 272, 274 occur at random locations along the lengths of the tracks. While there may be occasional random alignment between bit transitions, there is no coherent control of locations of bit transitions in FIG. 2B.

Spacings between centers of tracks 252, 254, 256, 258 are smaller than a width of the write head 260, and as successive tracks are written, a portion of a width of an earlier track is written over by the next successive track. The tracks overlap. The track 252 is written first. The track 254 overwrites a portion of the track 252. The track 256 overwrites a portion of the track 254. The track 258 overwrites a portion of the track 256. This process of overwriting is referred to as shingling. A read head 280 is narrower than the write head 260. The read head 280 has a small enough read width to be able to read an overwritten shingled track such as tracks 252, 254, 256. The read head 280 is aligned for reading tracks 252, 254, 256, 258 at locations 282, 284, 286, and as shown at 280 respectively.

The process of shingling provides narrower track widths and increases areal density. The read width of the read head 280 however becomes very narrow, and the read head 280 become increasingly difficult to manufacture because of the extremely small read width required.

In contrast with the magnetic media 200, 250 described above in connection with FIGS. 2A, 2B, magnetic media 300, 350 described below in connection with FIGS. 3A, 3B comprises data bits which are coherently aligned across tracks. In FIGS. 3A, 3B, transitions on multiple tracks align with one another along radial lines. The data bits in FIGS. 3A, 3B are mapped across tracks such that multiple tracks are read simultaneously to reproduce non-binary, multi-level data. The non-binary, multi-level data that is read is inverse mapped to reproduce stored data as described in more detail below in connection with FIGS. 4-11.

FIG. 3A illustrates a portion of perpendicular magnetic media 300 recorded on a spinning disc. The portion of magnetic media includes circular recorded tracks 302, 304, 306, 308 that are recorded by a recording head 310 in an overlapping manner referred to as "shingled". Only a small length of each track 302, 304, 306, 308 is illustrated in FIG. 3A. Track 302 is recorded with the recording head 310 in a radial position 312. Track 304 is recorded with the recording head 310 in a radial position 314. Track 306 is recorded with the recording head 310 in a radial position 316. Track 308 is recorded with the recording head 310 in a radial position as shown in FIG. 3A.

In FIG. 3A, the tracks 302, 304, 306, 308 are recorded with bits that have either a magnetic +1 state with magnetic flux having an upward direction relative to the disc surface, or a magnetic −1 state with magnetic flux having a downward direction relative to the disc surface. In FIG. 3A, a bit with the magnetic +1 state is marked by the symbol ⊙, and a bit with the magnetic −1 state is marked by the symbol ⊕.

In FIG. 3A, the tracks 302, 304, 306, 308 have bit transitions between bits such as an exemplary bit transition 318 on the track 302, a bit transition 320 on the track 304, a bit transition 322 on the track 306, and a bit transition 324 on the track 308. As illustrated in FIG. 3A, the bit transitions 318, 320, 322, 324 line up in alignment with one another along a radial line 326. The bit transitions 318, 320, 322, 324 occur at coherent locations along the lengths of the tracks. During a write operation, there is a coherent control of locations of bit transitions in FIG. 3A so that bit transitions align with one another along a generally radial line.

Spacings between centers of tracks 302, 304, 306, 308 are smaller than a width of the write head 310, and as successive tracks are written, a portion of a width of an earlier track is written over by the next successive track. The tracks overlap. The track 302 is written first. The track 304 overwrites a portion of the track 302. The track 306 overwrites a portion of the track 304. The track 308 overwrites a portion of the track 306. This process of overwriting is referred to as shingling. The read head 330 has a wide enough read width to be able to simultaneously read multiple shingled tracks such as tracks 302, 304, 306. Only a single pass of the read head 330 (i.e., a single rotation of the disc) is needed to read all the multilevel tracks 302, 304, 306, and there is not a need for multiple heads to read the multilevel tracks 302, 304, 306. There is not a need for or multiple passes to read the multilevel tracks 302, 304, 306, keeping read latency and complexity low. According to one aspect, the wider track 308 can be read as binary (not multilevel) data with the read head at location 331.

The process of shingling provides narrower track widths and increases areal density. The read width of the read head 330 however becomes wider than the narrow track width, and the read head 330 becomes easier to manufacture because of the wide width.

FIG. 3B illustrates a portion of longitudinal magnetic media 350 recorded on a spinning disc. The portion of magnetic media includes circular recorded tracks 352, 354, 356, 358 that are recorded by a recording head 360 in an overlapping manner referred to as "shingled". Only a small length of each track 352, 354, 356, 358 is illustrated in FIG. 3B. Track 352 is recorded with the recording head 360 in a radial position 362. Track 354 is recorded with the recording head 360 in a radial position 364. Track 356 is recorded with the recording head 360 in a radial position 366. Track 358 is recorded with the recording head 360 in a radial position as shown in FIG. 3B.

In FIG. 3B, the tracks 352, 354, 356, 358 are recorded with bits that have either a magnetic +1 state with magnetic flux having an forward direction relative to the disc rotation, or a magnetic −1 state with magnetic flux having a backward direction relative to the disc rotation. In FIG. 3B, a bit with the magnetic +1 state is marked by the symbol →, and a bit with the magnetic −1 state is marked by the symbol ←.

In FIG. 3B, the tracks 352, 354, 356, 358 have bit transitions between bits such as an exemplary bit transition 368 on the track 352, a bit transition 370 on the track 354, a bit transition 372 on the track 356, and a bit transition 374 on the track 358. As illustrated in FIG. 3B, the bit transitions 378, 370, 372, 374 do line up with one another along a radial line 376. The bit transitions 368, 370, 372, 374 occur at coherent locations along the lengths of the tracks. There is coherent control of locations of bit transitions in FIG. 3B.

Spacings between centers of tracks 352, 354, 356, 358 are smaller than a width of the write head 360, and as successive tracks are written, a portion of a width of an earlier track is written over by the next successive track. The tracks overlap. The track 352 is written first. The track 354 overwrites a portion of the track 352. The track 356 overwrites a portion of the track 354. The track 358 overwrites a portion of the track 356. This process of overwriting is referred to as shingling. The read head 380 has a wide enough read width to be able to simultaneously read multiple shingled tracks such as tracks 352, 354, 356. According to one aspect, the wider track 358 can be read as binary (not multilevel) data with the read head at location 381.

The process of shingling provides narrow track widths and increases areal density. The read width of the read head 380 however becomes wider, and the read head 380 become increasingly easy to manufacture because of the extremely wide read width required.

Figure 4:
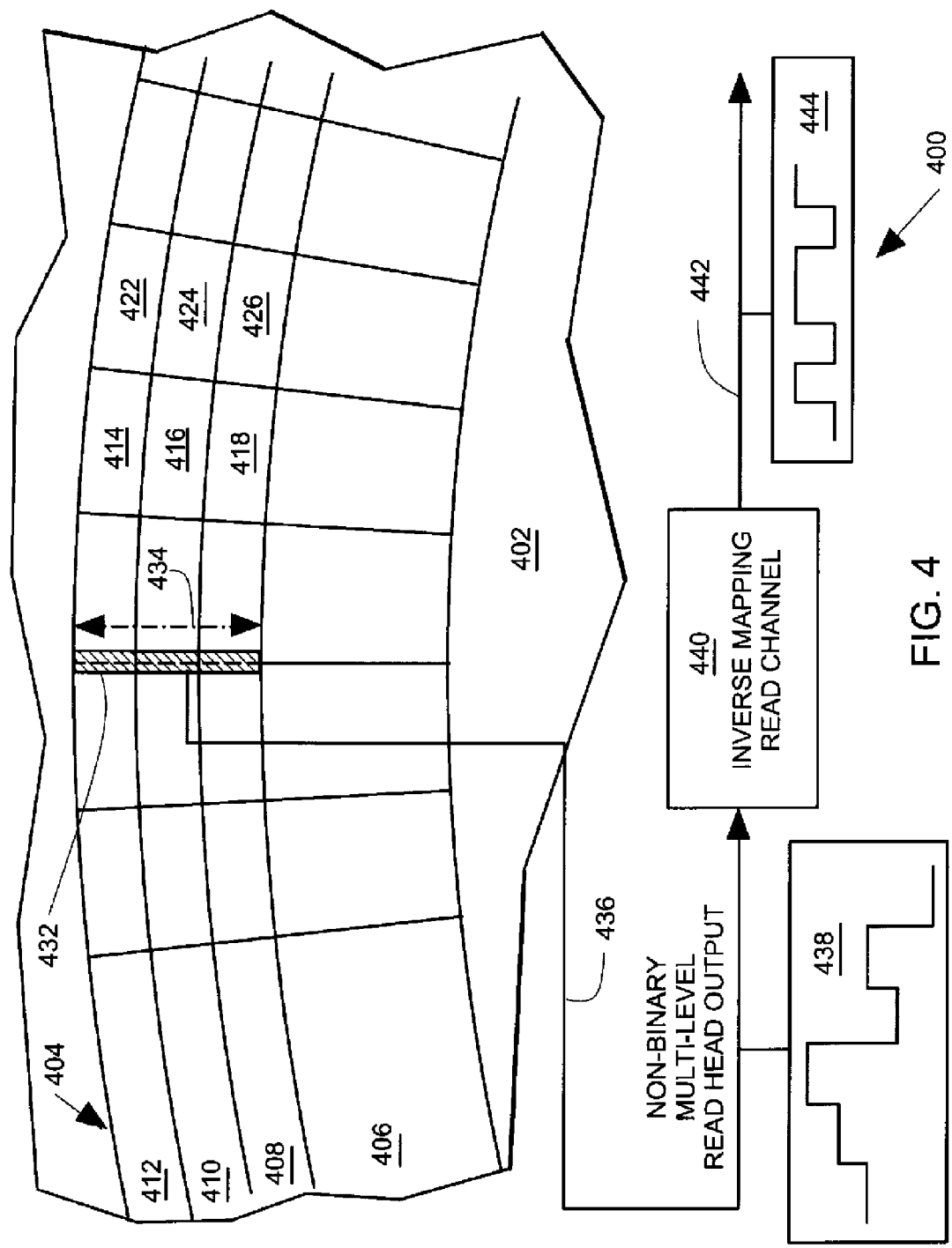
FIG. 4 illustrates a data storage system with coherent, shingled tracks and an inverse mapping read channel.

FIG. 4 illustrates a data storage system 400. The data storage system 400 comprises magnetic recording media 402. The recording media 402 includes a coherent shingled track pattern 404. The coherent shingled track pattern 404 includes a relatively wider track 406, and relatively narrower multiple data tracks 408, 410, 412 in which mapped data bits (such as data bits 414, 416, 418, 422, 424, 426) are recorded. The mapped data bits (such as data bits 414, 416, 418, 422, 424, 426) are coherently aligned with one another across the multiple data tracks 408, 410, 412. Transitions between data bits are aligned across the tracks 408, 410, 412.

The data storage system 400 comprises a read head 432. The read head 432 has an effective read head width 434 that extends across the multiple data tracks 408, 410, 412. The read head 432 is aligned to coherently read the mapped data bits (such as data bits 414, 416, 418, 422, 424, 426). The read head 432 has a read head output 436. The read head output 436 comprises a non-binary multi-level amplitude summation 438 of the mapped data bits.

According to one aspect, the magnetic recording media 402 comprises perpendicular recording media, and the read head 432 reads combined +1 and −1 levels coherently from multiple tracks. According to another aspect, the magnetic recording media 402 comprises longitudinal recording media, and the read head 432 coherently reads multiple transitions between +1 and −1 levels from the multiple tracks.

The read head 432 simultaneously reads the multiple data tracks 408, 410, 412 in a single pass of the read head 432 over the magnetic recording media 402. The data storage system 400 comprises a read channel 440. The read channel 440 receives the read head output 436. The read channel 440 provides an inverse-mapped read channel output 442. The inverse-mapped read channel output 442 comprises multiple binary data bits 444 that correspond with the recorded mapped data bits.

Figure 5:
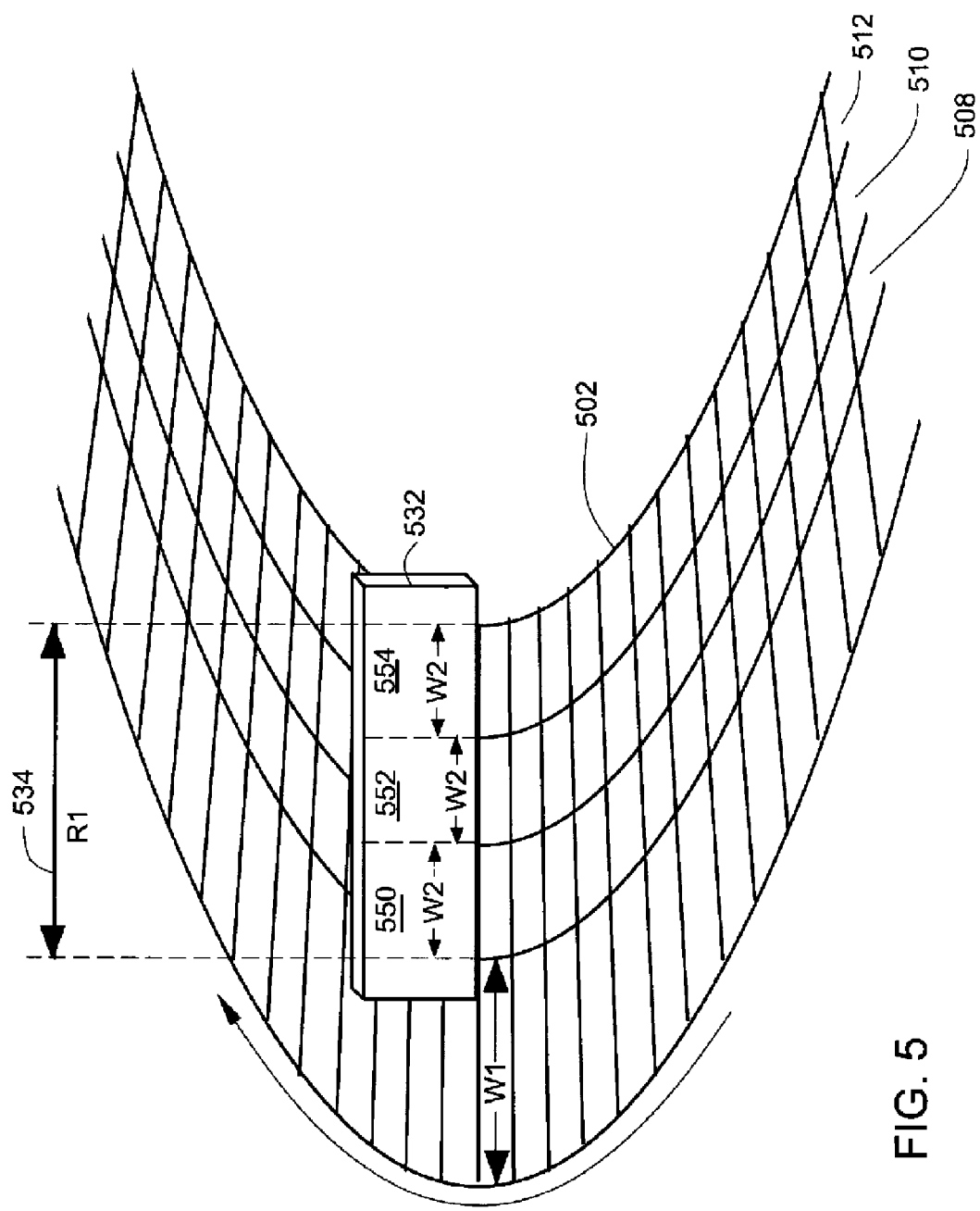
FIG. 5 illustrates an oblique view of coherent, shingled recording media and a read head.

FIG. 5 illustrates an oblique view of coherent shingled recording media 502 and a read head 532. The read head 532 comprises an effective read head width R1 illustrated at 534. The read head 532 simultaneously reads shingled, coherent tracks 508, 510, 512. The read head includes regions 550, 552, 554 that are sensitive to reading data from the magnetic media 502. The regions 550, 552, 554 are electrically in series, and the electrical output of the read head 532 comprise a sum of individual voltages produced in the regions 550, 552, 554. The individual voltages produced in the regions 550, 552, 554 are superimposed (summed, added) in the output of the read head 532. According to one aspect, the tracks 508, 510, 512 can have the same widths W2 as one another, and the read head 532 can have substantially uniform sensitivity in each of the regions 550, 552, 554. According to another aspect, the tracks 508, 510, 512 can have widths that are different from one another, and the read head 532 can have a compensating non-uniform sensitivity in the regions 550, 552, 554. According to yet another aspect, the read head 532 can have a Gaussian sensitivity distribution and the track width 508, 510, 512 can be adjusted in width to compensate for the Gaussian sensitivity distribution of the read head 532.

A single read head has a read width R1. Read width R1 is approximately equal to (N−1)(W2). During a read operation, the read head aligns with tracks 1, 2, . . . (N−1) simultaneously. The last track, track N, has a wider width W1. According to one aspect, the wider width W1 is has a width equal to (N−1)(W2). According to one aspect, data from the last track N is read conventionally (i.e., binary signaling). According to one aspect, all of these tracks that are read in the multilevel read operation have the same width W2, and produce equal amplitude, coherent signals in the read head. The read head 532 effectively adds up or makes a summation of the signal amplitudes from all the tracks that are read in the multilevel read operation.

In the case of longitudinal recording, the read signals are typically transitions due to fringing external magnetic field at transitions between +1 and −1 bits. In the case of perpendicular recording, the read signals are typically due to external magnetic fields of the perpendicular bits, and take the form of dibits from the read head.

The signal from the read head 532 can take on multiple amplitude levels depending on a read head summation of different numbers of +1 and −1 bits that are read. Different data patterns in the multiple tracks that are read can result in the same sum, so there is not a one-to-one correspondence between a read head summation level and a single data pattern. This ambiguity is resolved by mapping algorithms in the write process, and corresponding inverse mapping algorithm in the read process as described below in more detail in connection with FIGS. 6-11.

Use of the techniques disclosed results in increased areal density (AD) and avoids the use of multiple read channels, avoids the use of high latency multiple pass reading of tracks, and permits use of a read head that is wider than the track width W2.

Figure 6:
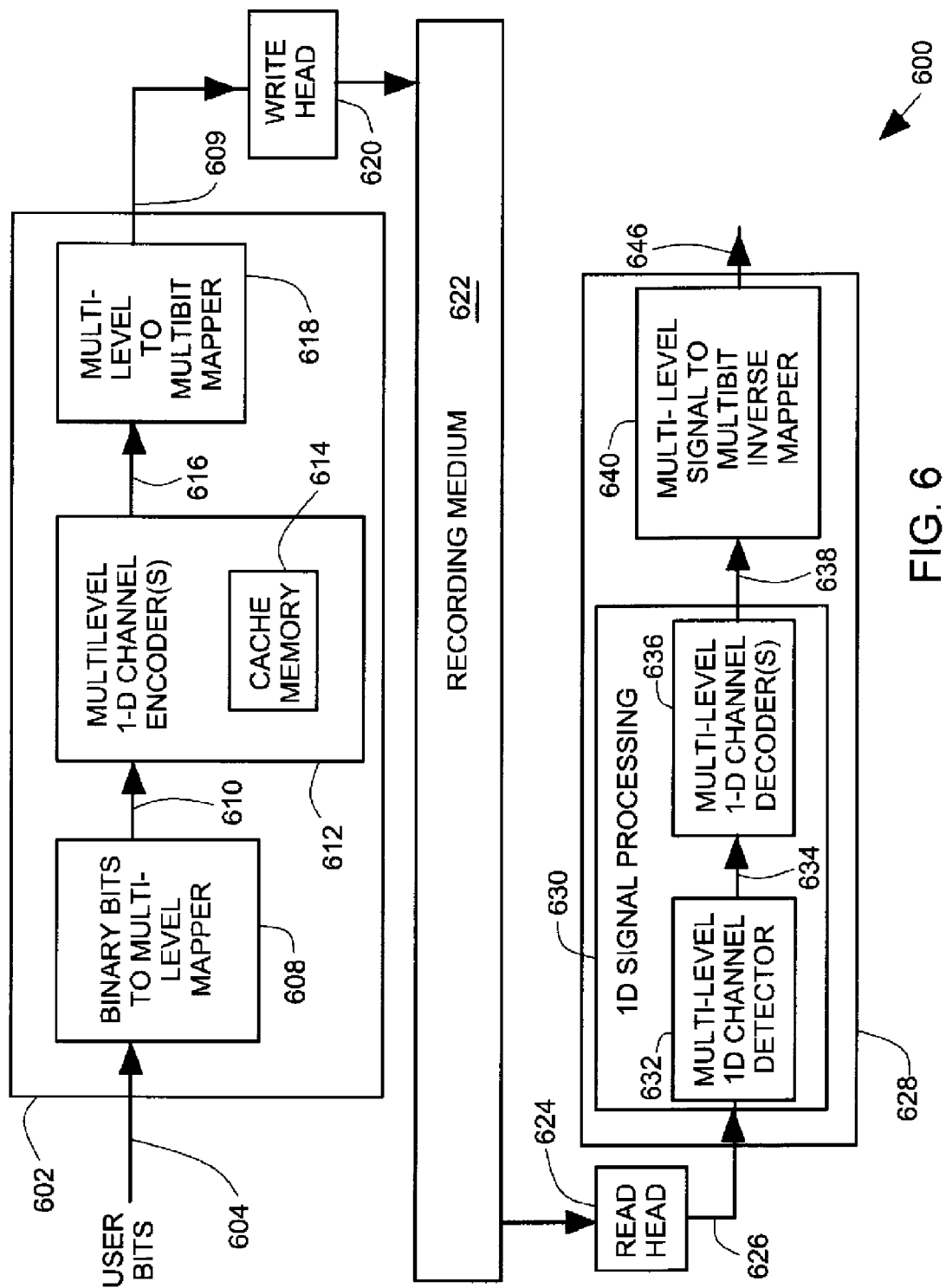
FIG. 6 illustrates a block diagram of a recording channel in a data storage system.

FIG. 6 illustrates a block diagram of a recording channel 600 in a data storage system (such as disc drive 100 in FIG. 1). The recording channel 600 comprises a write channel 602. The write channel 602 receives user bits 604 that are to be recorded. The write channel 602 provides a write channel output 609 of mapped data. The user bits are binary bits, and the mapped data comprises binary bits that are mapped to be recorded onto multiple shingled tracks. According to one aspect, the user bits 604 comprise error correction coded user data.

The write channel 602 comprises a binary-to-multilevel mapper 608. According to one aspect, the binary-to-multilevel mapper 608 maps two input binary bits to 4 output levels. The binary-to-multilevel mapper 608 provides a mapper output 610.

The mapper output 610 couples to a multilevel one dimensional (1-D) channel encoder(s) (also including modulation codes) 612. The multilevel 1D channel encoder 612 includes cache memory 614. According to one aspect, the cache memory 614 comprises volatile memory. According to another aspect the cache memory 614 comprises a solid state device (SSD) such as dynamic or static random access memory (RAM). According to one aspect, the cache memory 614 stores level data to be stored on later tracks while waiting for data on earlier tracks to be written. The multilevel 1D channel encoder 612 provides an encoder output 616.

The encoder output 616 couples to a multilevel-to-multibit mapper 618. According to one aspect, the multilevel-to-multibit mapper 618 maps 4 input levels to 3 output bits. The mapper 618 provides the write channel output 609 of mapped data.

The write channel output 609 couples to a write head 620. The write head 620 writes the data from the write channel output 609 on to recording medium 622. According to one aspect, the recording medium 622 comprises longitudinal recording media, and the data is recorded as bit transitions. According to another aspect, the recording medium 622 comprise perpendicular recording media, and the data is recorded as bits.

According to one aspect the write channel output 609 comprises bit patterns that do not require added channel coding.

A read head 624 reads data from the recording medium 622. The read head 624 provides a read output 626 to a read channel 628.

The read channel 628 comprises a one dimensional (1D) signal processing block 630. The 1D signal processing block 630 comprises a multi-level 1D channel detector 632 that receives the read output 626. The multi-level 1D channel detector 632 provides a channel detector output 634. The channel detector output 634 couples to multi-level 1-D channel decoder(s) 636 in the 1D signal processing block 630. The multi-level to binary bit decoder 636 provides a binary bit output 638 that represents recovered multiple levels.

A multi-level to binary bit inverse mapper 640 receives the binary bit output 638. The inverse mapper 640 provides recovered user bits 646. According to one aspect, the inverse mapper 640 maps a 4 level signal to 2 user bits. According to one aspect, the recovered user bits comprise error correction coded user bits, and are provided to an error correction decoder (not illustrated).

An example of a 2 Bit (b1b2) to a 4-level (Levels 1, 2, 3, 4) signal mapper comprises:
b1b2=00 maps to Level=1
b1b2=01 maps to Level=2
b1b2=10 maps to Level=3
b1b2=11 maps to Level=4.

An example of a 4-level signal to 2 bit inverse mapper comprises:
L=1 inverse maps to b1b2=00
L=2 inverse maps to b1b2=01
L=3 inverse maps to b1b2=10
L=4 inverse maps to b1b2=11.

Figure 7:
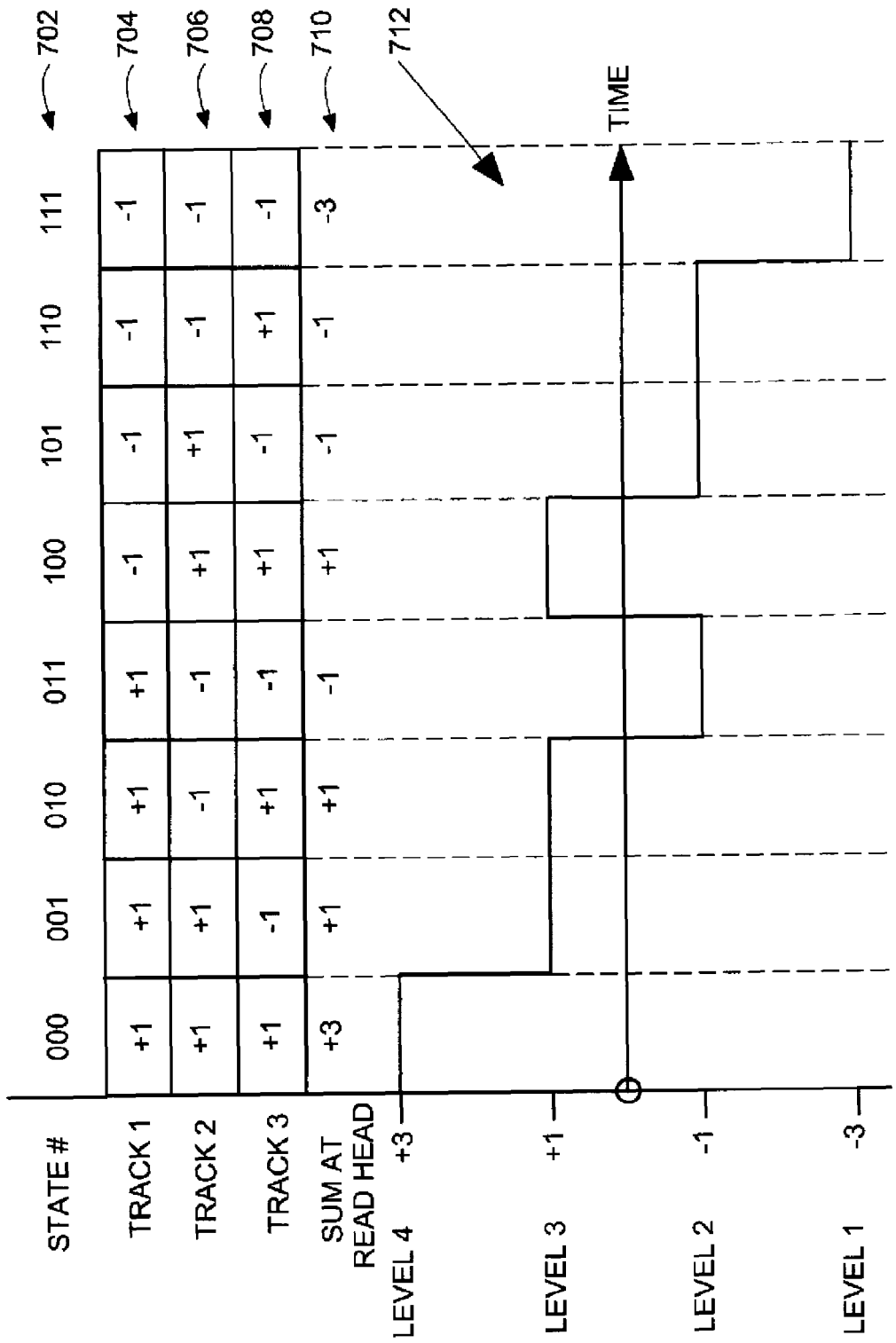
FIG. 7 illustrates a timing diagram of magnetic states on shingled, coherent tracks that represent coherent states, and the levels that are read by a read head for these coherent states.

FIG. 7 illustrates a timing diagram of magnetic states on shingled tracks 1, 2, and 3 that represent 8 possible coherent states, and the levels that are read by a read head for these 8 possible coherent states. The 8 possible coherent states are numbered by binary logical state numbers 000 through 111 at 702. The +1 and −1 magnetic states on tracks 1, 2 and 3 are shown at 704, 706, 708 respectively. A sum which is read at a read head output is shown at 710. A graph of the read head output is illustrated at 712. It can be seen by inspection of FIG. 7, that the sum +1 (in line 710) can be formed by three different magnetic data patterns at coherent state numbers 001, 010 and 100 (in line 702). It can be seen by inspection of FIG. 7, that the sum −1 can be formed by three different magnetic data patterns at coherent state numbers 011, 101, 110. According to one aspect, the state numbers for +1 and −1 sums can be selected to optimize system performance such as minimizing transitions and reducing transition jitter, or to estimate read head position relative to a track center.

Figure 8:
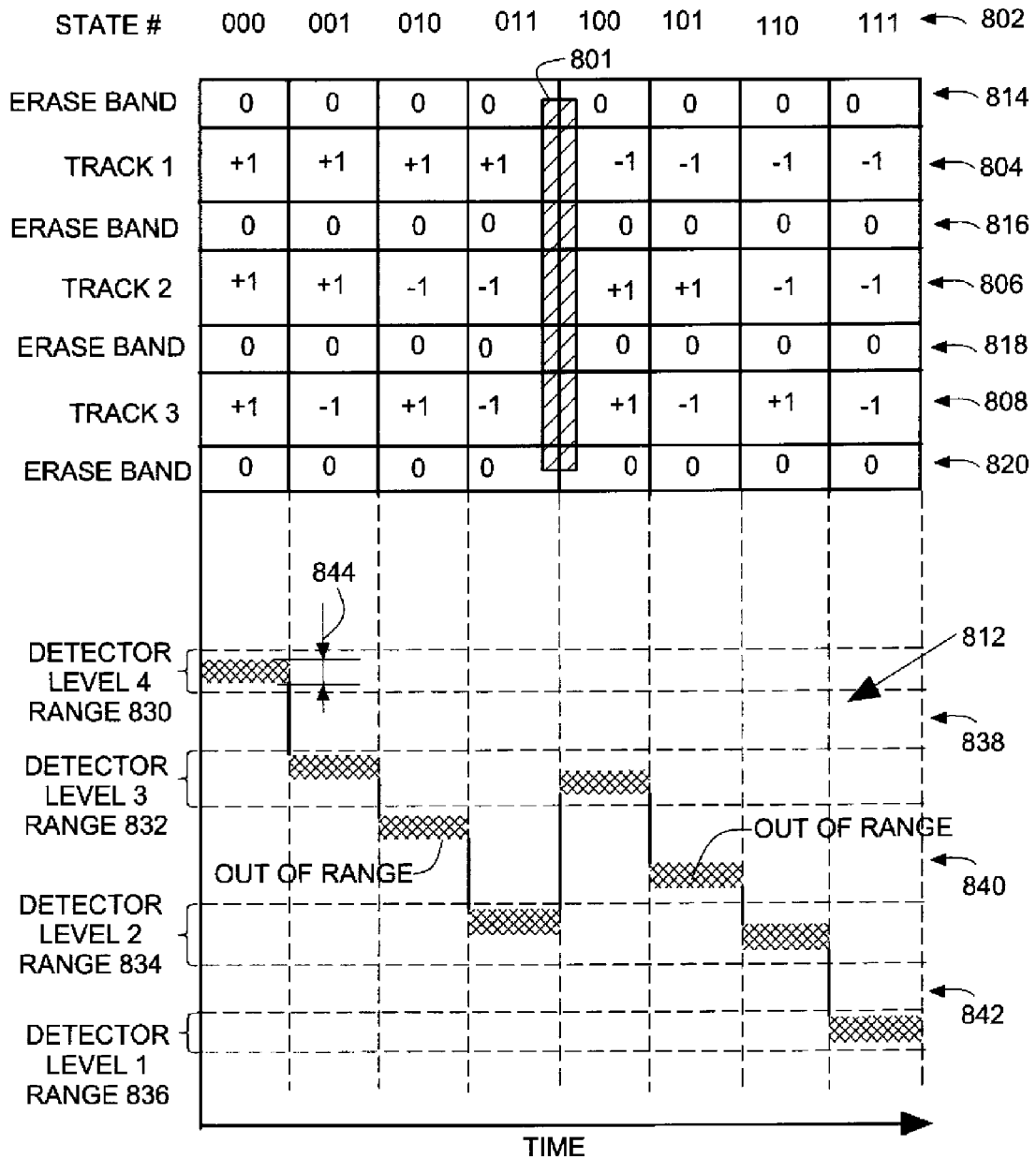
FIG. 8 illustrates a timing diagram of magnetic states on coherent shingled tracks separated by erase bands, and the levels that are read by a read head in the presence of adjacent track interference.

FIG. 8 illustrates a timing diagram of magnetic states on coherent shingled tracks 804, 806, 808 that represent 8 possible coherent states, and the levels that are read by a read head 801 for these 8 possible coherent states. The 8 possible coherent states are numbered by binary logical state numbers 000 through 111 at 802. The +1 and −1 magnetic states on tracks 1, 2 and 3 are shown at 804, 806, 808 respectively.

In FIG. 8, the magnetic medium is provided with erase bands 814, 816, 818, 820 that separate coherent shingled tracks 804, 806, 808. The coherent shingled tracks 804, 806, 808 have the same width as one another. The erase bands are marked with a magnetic state "0".

A read head 801 reads data from the magnetic media. The read head 801 comprises a Gaussian cross-track sensitivity profile of full width half maximum profile of 1.1 tracks in the presence of 10% erase band. A graph of an output of the read head 801 is illustrated at 812. It can be seen by inspection of FIG. 8, that read head output levels are shifted away from nominal levels 1, 2, 3, 4 (FIG. 7) by the Gaussian cross-track profile.

It can also be seen by inspection of FIG. 8 that the read head output levels can take multiple values in a noise range such as exemplary noise range 844 for state number 000. The noise range is due mainly to adjacent track interference, but also include noise components of temperature variation, fly height variation and the like.

A multilevel channel detector (such as multilevel channel detector 632 in FIG. 6) comprises detector level ranges 830, 832, 834, 836 that are separated by noise guard bands 838, 840, 842.

As illustrated in FIG. 8, output levels of read head 801 can fall outside of detector level ranges in the noise guard bands as illustrated for state numbers 010 and 101. The state numbers 010 and 101 are thus not usable, however, there are 6 remaining state numbers that are adequate to define the 4 levels that are needed in this example.

Figure 9:
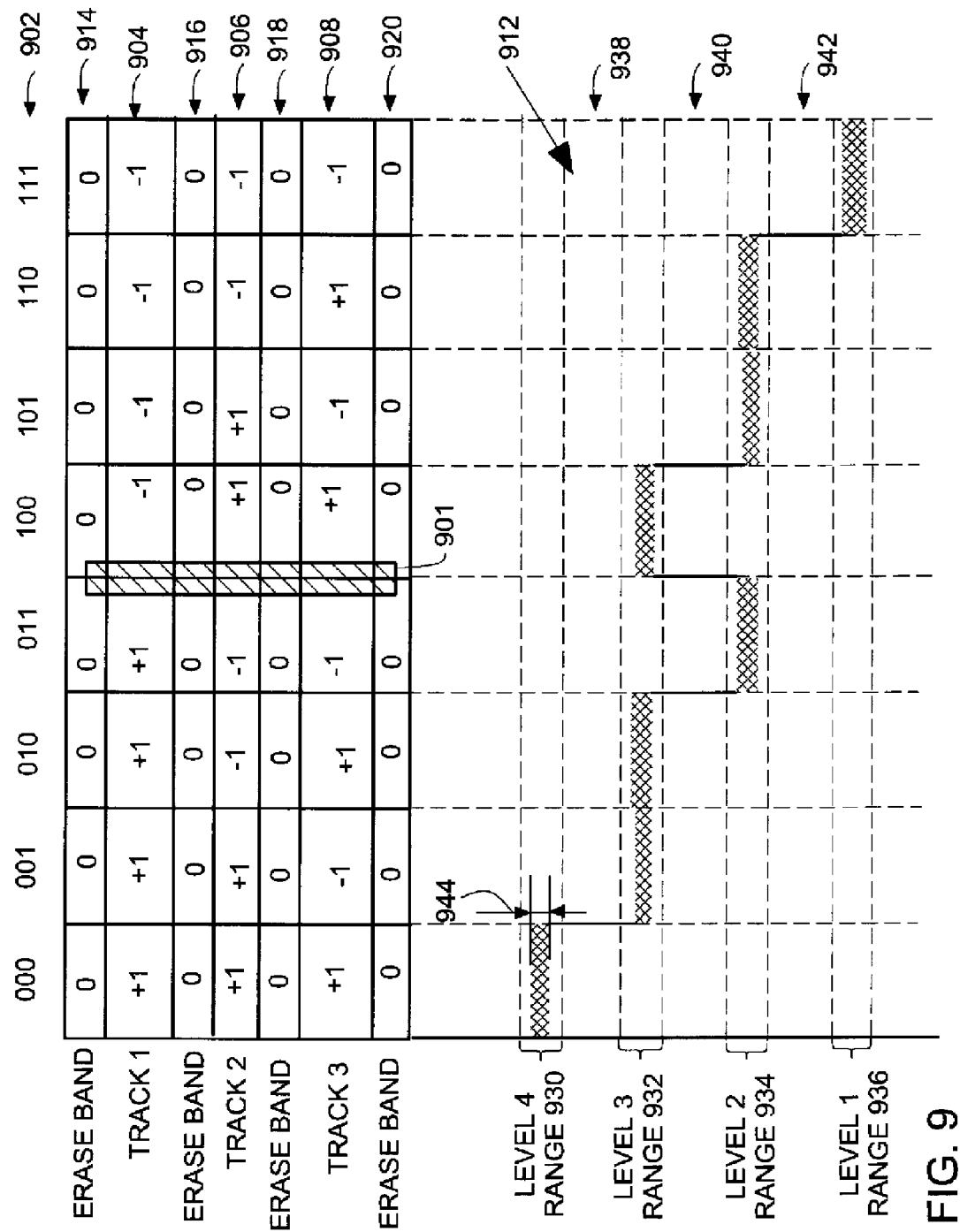
FIG. 9 illustrates a timing diagram of magnetic states on coherent shingled tracks whose track widths are adjusted accordingly and separated by erase bands, and the levels that are read by a read head in the presence of adjacent track interference.

FIG. 9 illustrates a timing diagram of magnetic states on coherent shingled tracks 904, 906, 908 that represent 8 possible coherent states, and the levels that are read by a read head for these 8 possible coherent states. The 8 possible coherent states are numbered by binary logical state numbers 000 through 111 at 902. The +1 and −1 magnetic states on tracks 1, 2 and 3 are shown at 904, 906, 908 respectively.

In FIG. 9, the magnetic medium is provided with erase bands 914, 916, 918, 920 that separate coherent shingled tracks 904, 906, 908. The coherent shingled tracks 904, 906, 908 do not have the same width as one another. Track 906 is narrowed, as illustrated, relative to the widths of tracks 904, 908 to at least partially compensate for the Gaussian sensitivity profile of the read head 901. The erase bands are marked with a magnetic state "0".

A read head 901 reads data from the magnetic media. The read head 901 comprises a Gaussian cross-track sensitivity profile of full width half maximum profile of 1.1 tracks in the presence of 10% erase band. A graph of an output of the read head 901 is illustrated at 912. It can be seen by inspection of FIG. 9, that read head output levels, which are compensated by unequal track widths are only slightly shifted away from nominal levels 1, 2, 3, 4 (FIG. 7) by the Gaussian cross-track profile.

It can also be seen by inspection of FIG. 9 that the read head output levels can take multiple values in a noise range such as exemplary noise range 944 for state number 000. The noise range is due mainly to adjacent track interference, but also include noise components of temperature variation, fly height variation and the like.

A multilevel channel detector (such as multilevel channel detector 632 in FIG. 6) comprises detector level ranges 930, 932, 934, 936 that are separated by noise guard bands 938, 940, 942. As illustrated in FIG. 9, none of the noise ranges fall outside the detector range levels 930, 932, 934, 936 due to the compensation provided. All 8 state numbers are thus useable.

Figure 10:
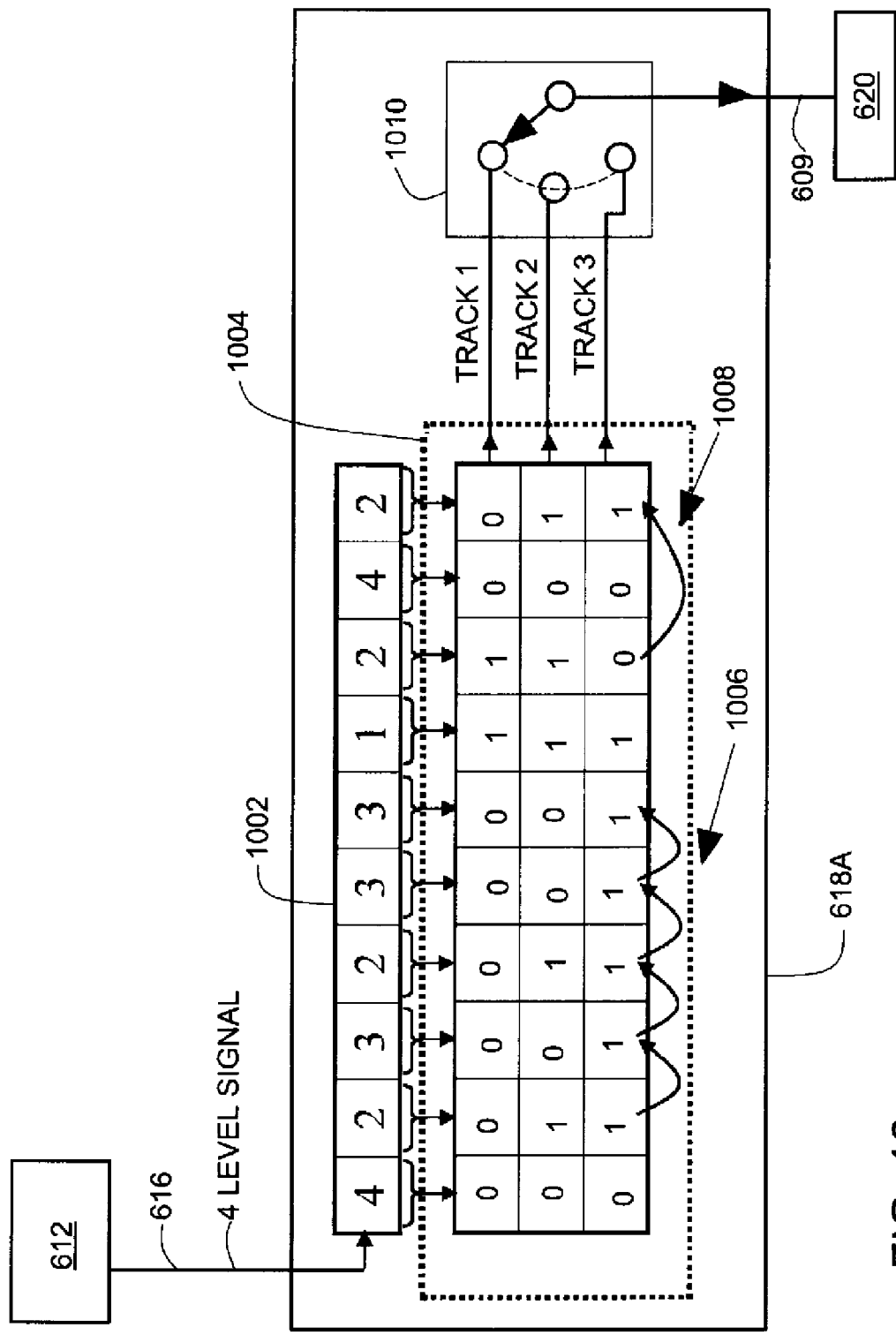
FIG. 10 illustrates an exemplary multichannel one dimensional channel mapping algorithm.

FIG. 10 illustrates an exemplary multilevel to multibit mapper 618A which can be used as the mapper 618 in FIG. 6. The mapper 618A receives a 4 level signal on line 616. A sequence of 4 level symbols are stored in a register 1002. The 4 level symbols stored in register 1002 control mapping of a sequence of 3 bit sequences (corresponding with state numbers in FIG. 7) stored in a cache memory 1004.

The three bit sequence, which are made up of logic levels 1 and 0 correspond with magnetic states −1 and +1 on the magnetic media. According to one aspect, the logic level 1 corresponds with the magnetic state −1, and the logic level 0 corresponds with the magnetic state +1. As described above in connection with FIG. 7, some of the level codes can be represented alternatively by more than one 3 bit sequence (i.e. more than one state number, which provides flexibility in choosing a three bit sequence. As illustrated at 1006, alternative 3 bit codes are chosen to minimize transitions and media jitter in a sequence of 3 bit sequences. As illustrated at 1008, alternative 3 bit codes are chosen to provide position estimation relative to track center.

Figure 11:
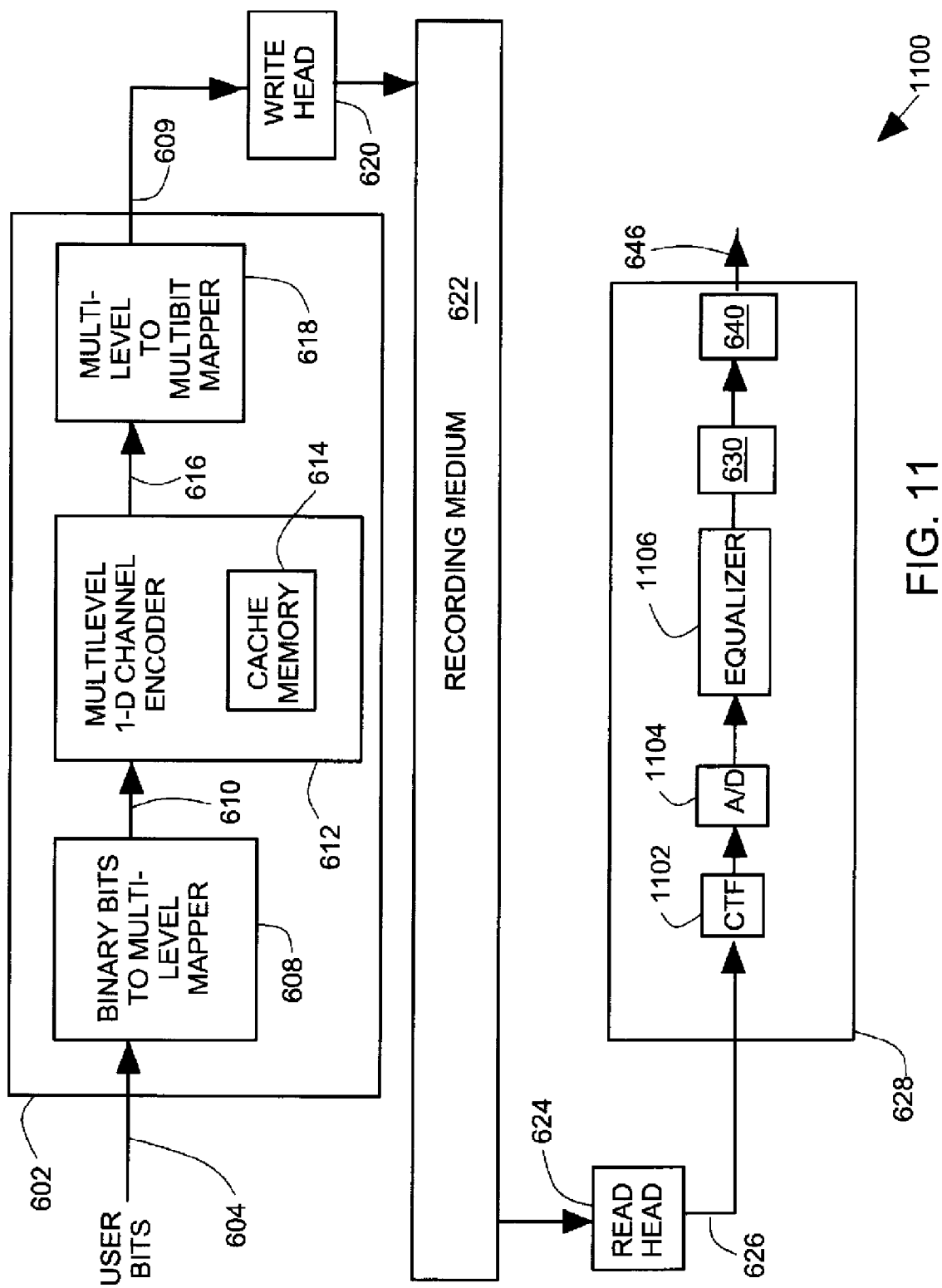
FIG. 11 illustrates a block diagram of a recording channel that includes a continuous time filter, an analog to digital converter, and an equalizer.

FIG. 11 illustrates a block diagram of a recording channel 1100 in a data storage system (such as disc drive 100 in FIG. 1). The recording channel 1100 is similar to the recording channel 600 in FIG. 6, except that the read channel 628 in FIG. 11 additionally includes a continuous time filter 1102, an analog to digital converter 1104, and an equalizer 1106. In other respects the recording channels 600 and 1100 are the same.

Figure 12:
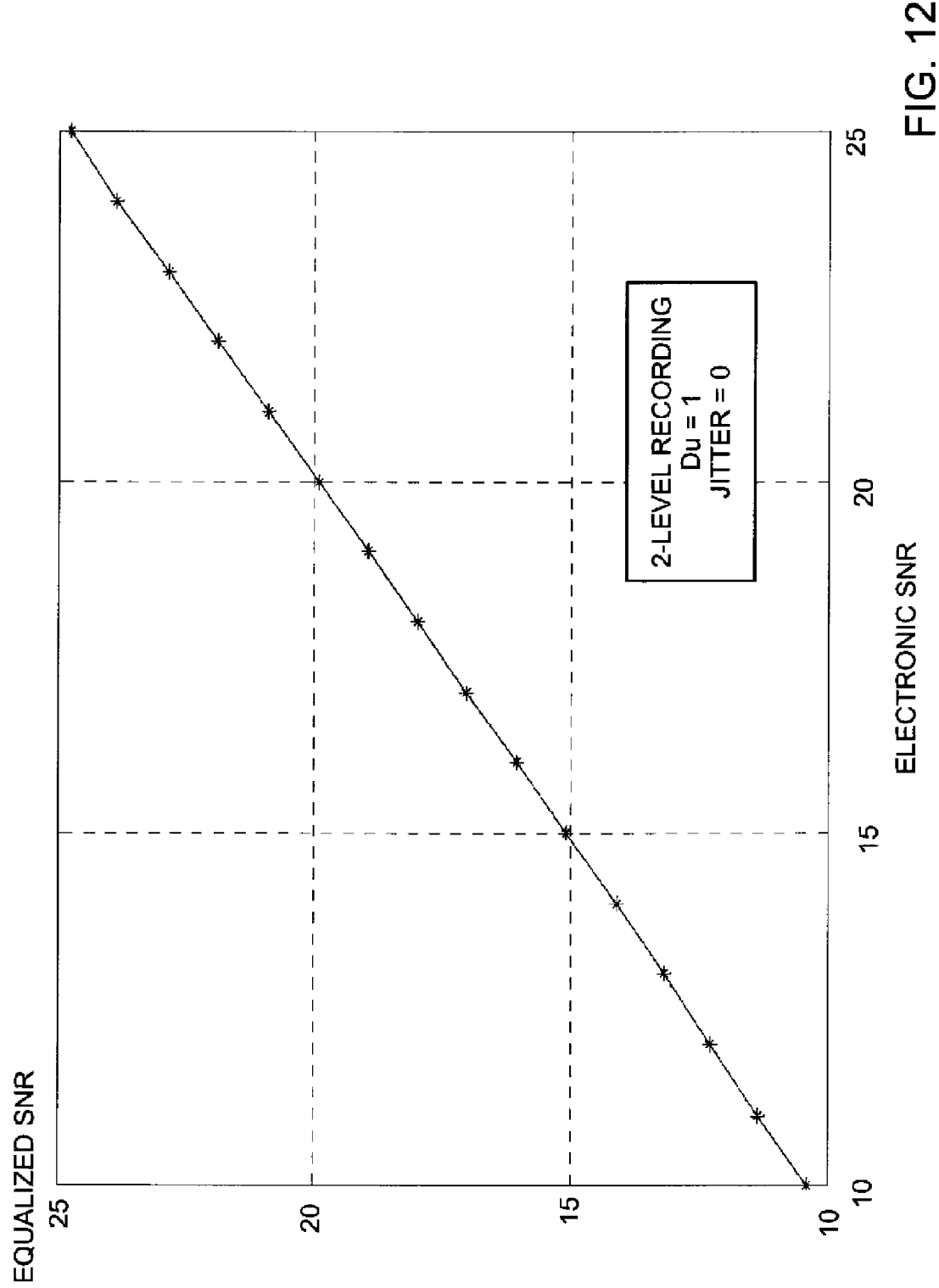
FIGS. 12-13 illustrate equalized signal-to-noise ratios of a traditional recording channel with normalized density $Du=1$ and jitter=0 (FIG. 12) and with normalized density $Du=2$ and jitter=0 with read heads having different cross track sigma values for the Gaussian sensitivity distributions.
Figure 13:
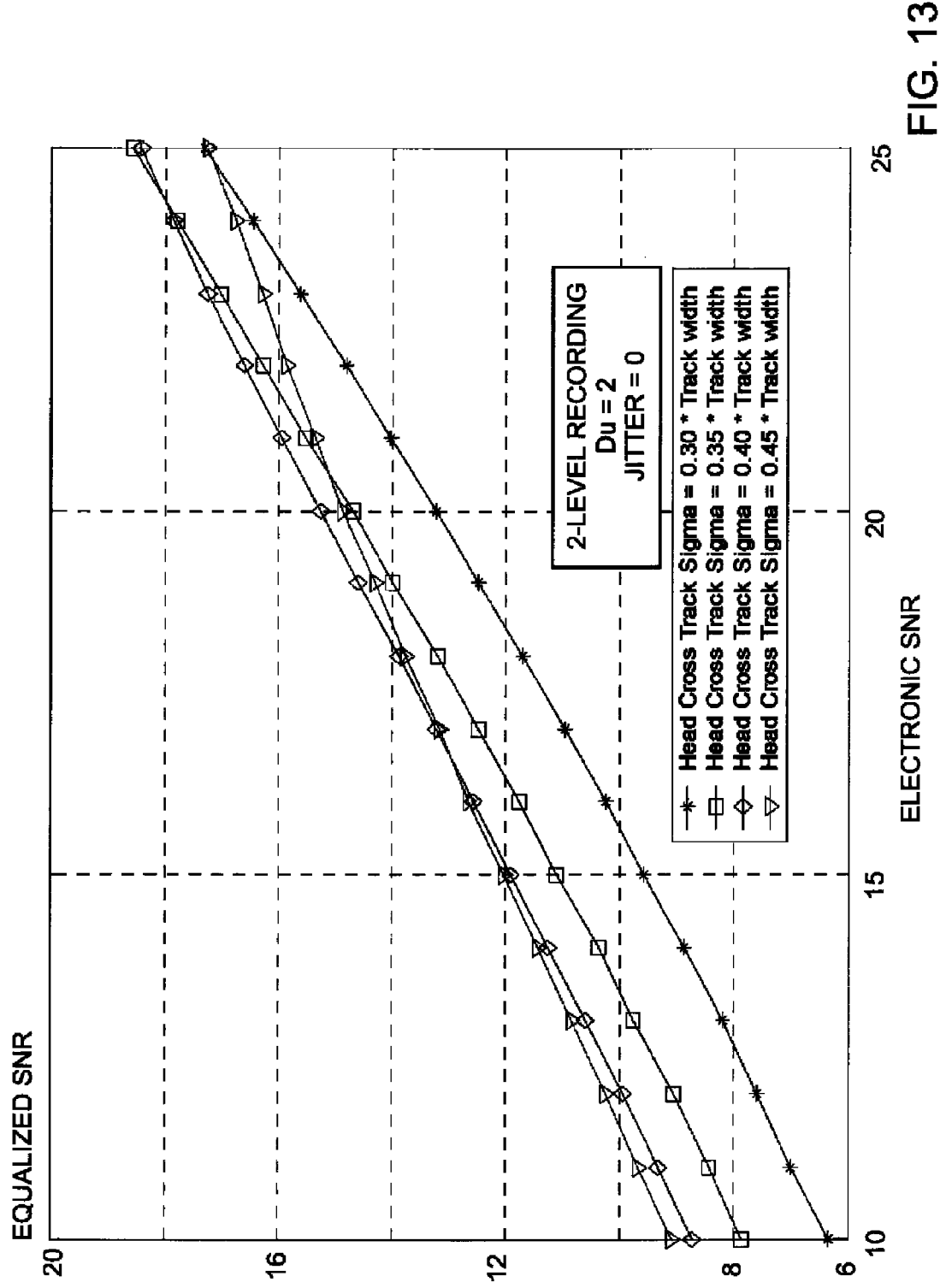

FIGS. 12-13 illustrate equalized signal to noise ratios (SNRs) in decibels (dB) of a traditional recording channel with normalized density Du=1 and jitter=0 (FIG. 12) and with normalized density Du=2 and jitter=0 with different Gaussian heads having different cross track sigma values for the Gaussian sensitivity distributions (FIG. 13).

Figure 14:
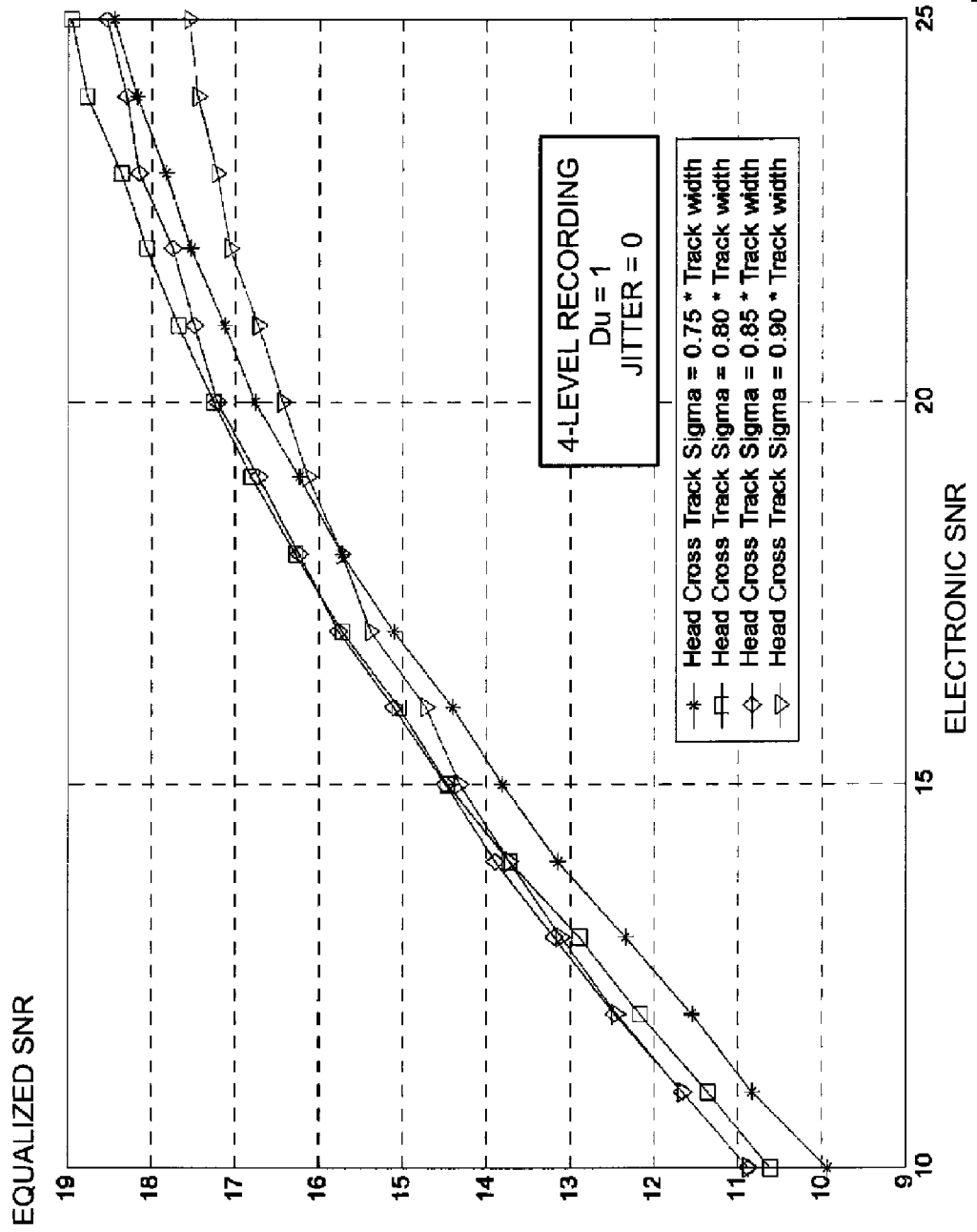
FIG. 14 illustrates equalized signal to noise ratio of a 4 level recording channel with normalized density $Du=1$ and jitter=0 with read heads with different cross track sigma values for the Gaussian sensitivity distributions.

FIG. 14 illustrates equalized signal to noise ratios (SNRs) in decibels (dB) of a 4 level recording channel with normalized density Du=1 and jitter=0 with different Gaussian heads with different cross track sigma values for the Gaussian sensitivity distributions. It can be seen by comparison of data in FIG. 14 to FIGS. 12-13 that the 4 level recording on shingled coherent media in FIG. 14 provides an increase in SNR.

Figure 15:
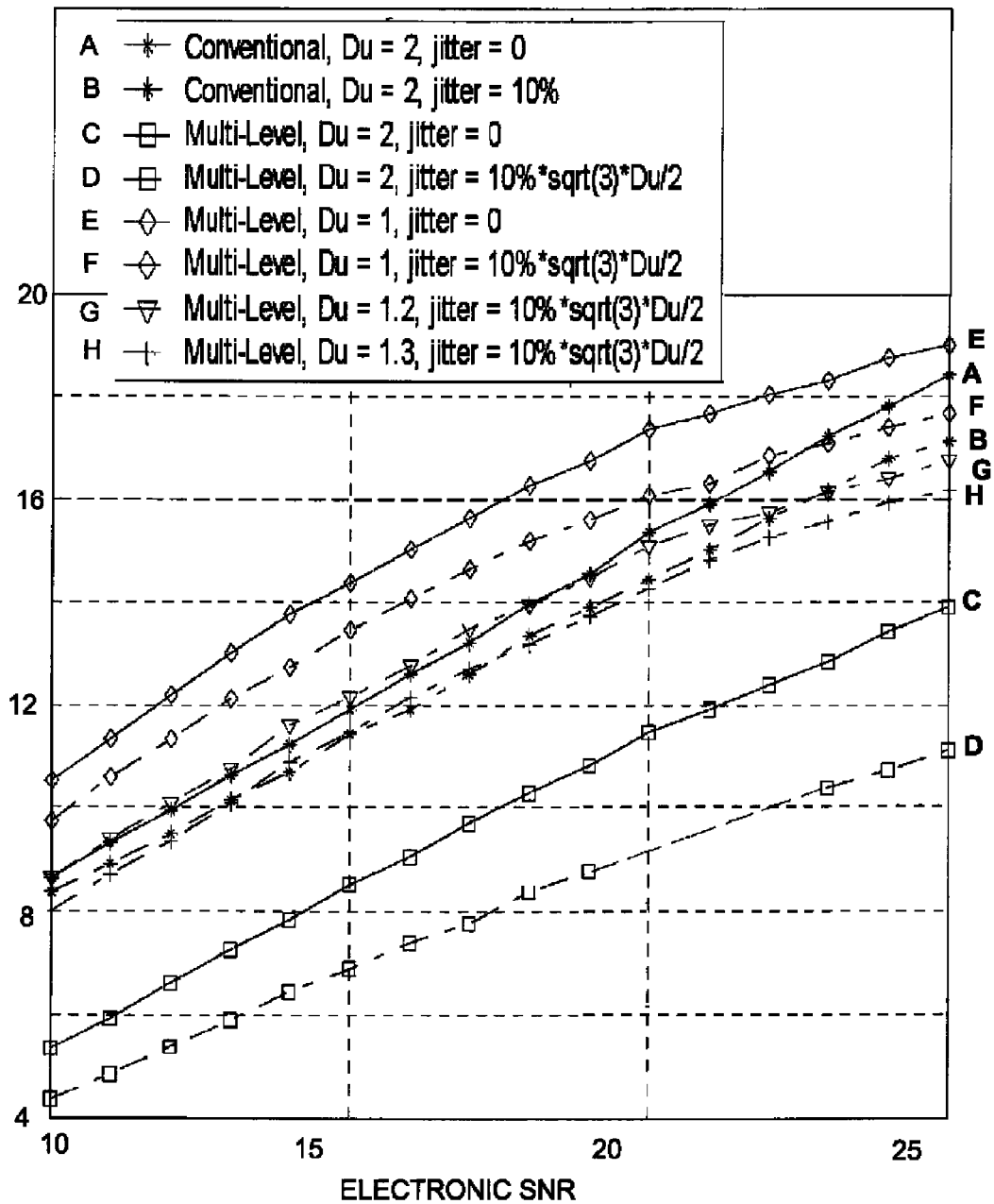
FIGS. 15-17 illustrate equalized signal to noise ratio for both conventional two level media recording on non-coherent shingled media as well as multilevel recording on coherent shingled media.
Figure 16:
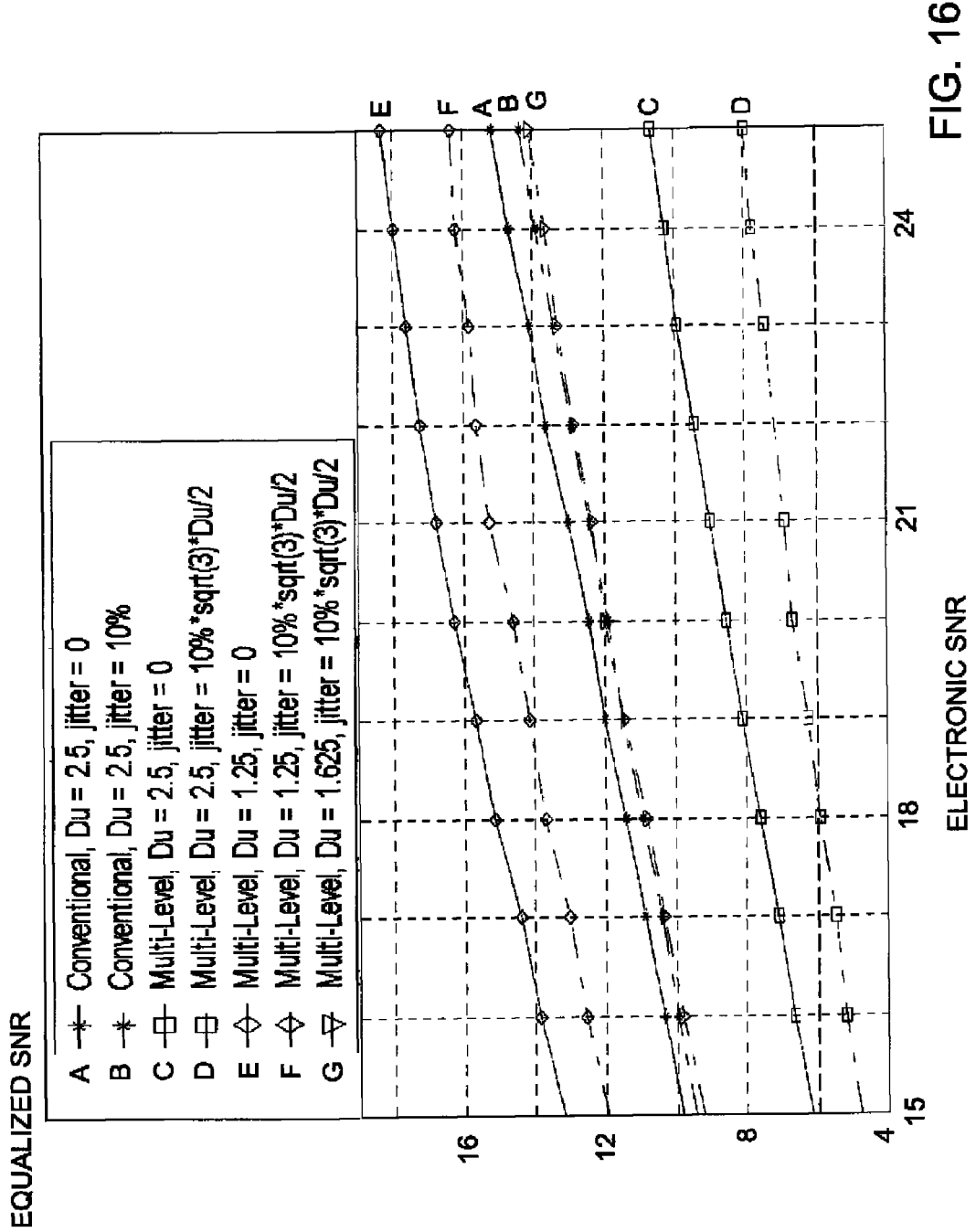
Figure 17:
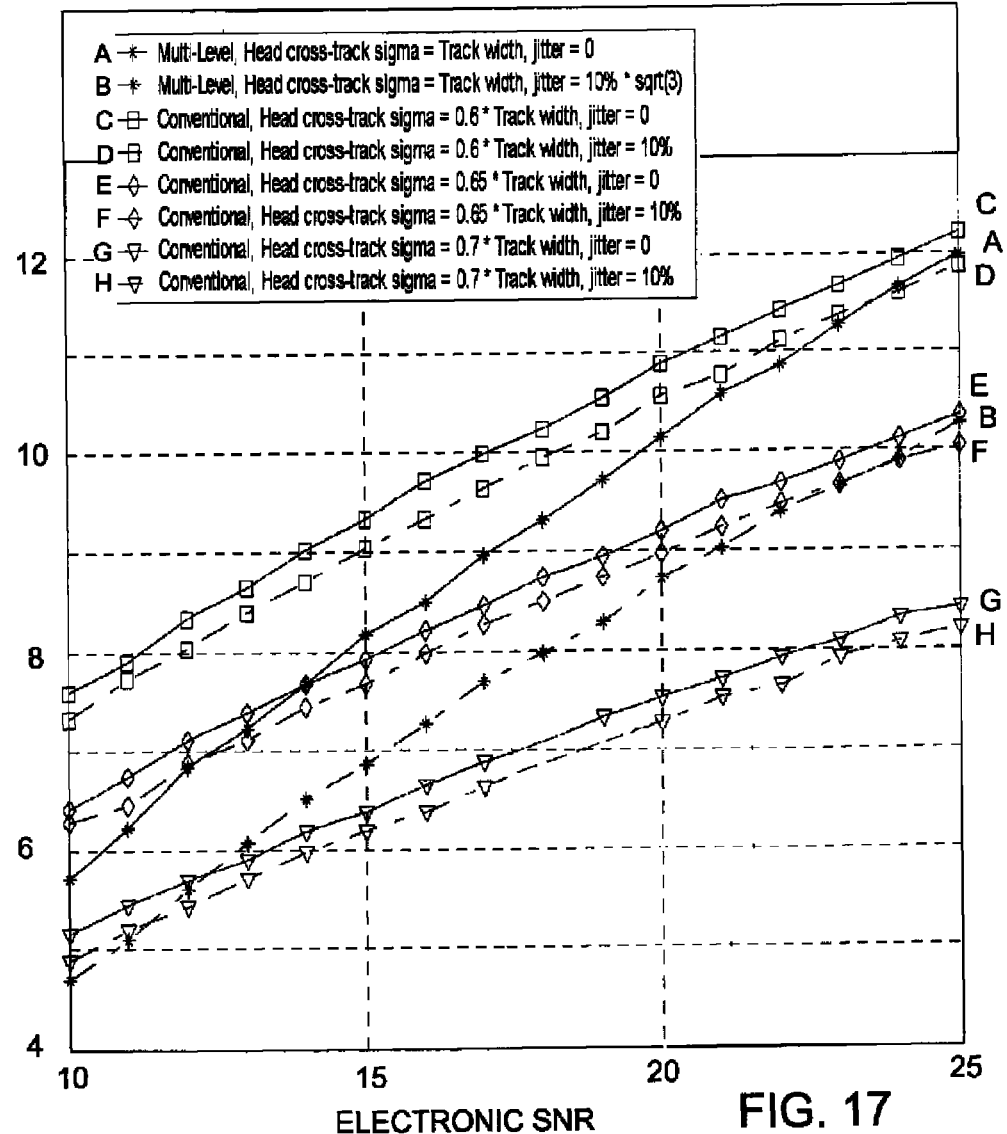

FIGS. 15-17 illustrate equalized signal to noise ratios (SNR) in decibels (dB) for both conventional two level media recording on non-coherent shingled media as well as multilevel recording on coherent shingled media. It can be seen by comparison of the data that the multilevel recording on shingled coherent media provides increased SNR under various operating conditions.

An equalizer (such as equalizer 1106 in FIG. 11) is jointly optimized with a write channel equalizer target response using the monic constraint for each case, either conventional or Multi-Level. The noise term in SNR at the output of the equalizer is defined as the variance of the difference of the desired signal (channel bits convolved with the equalizer target response) and the actual signal (the output of the equalizer) for both the conventional and the Multi-Level case. However, the signal term is chosen different between these two cases. In the conventional case, it is defined as the signal dynamic range in the eye diagram in absence of any noise but in presence of intertrack interference ITI (if there is any). On the other hand, in Multi-Level it is chosen as the average of the signal levels, for example, the average of the 3 levels in FIG. 11, in presence of only ITI. In conventional binary recording, when the read-head cross track dimension is chosen such that there is minimal ITI, then the signal energy at the output of the equalizer is limited by the read-head dimensions, while in Multi-Level it is generally limited by ITI as by design the read head dimension is chosen to be larger.

The electronic noise value is chosen such that the SNR value at the output of the equalizer equals to the electronic SNR value added to the system when the Gaussian cross-track head profile sigma is equal to 0.3 of the track width, as shown in FIG. 14. This electronic noise level is then fixed for a given SNR value for both the conventional binary and proposed Multi-Level architectures.

A conventional binary system with no jitter noise at normalized density Du equal to 2 is selected, and the Gaussian cross-track head profile sigma parameter is optimized for the conventional binary system which results in the highest SNR at the output of the equalizer. As seen from FIG. 13, once the sigma value is chosen less than 0.4 of the track width, the signal energy reduces and the SNR at the output of the equalizer drops. If it is increased to larger than 0.4, then this time the SNR levels off at high SNRs because now the head starts to pick up interference from neighboring tracks. According to one aspect, 0.4 of the track width is the best in this SNR range, and sigma is fixed to this value for the rest of this section. Repeating the same for Multi-Level architecture as shown in FIG. 14, and choose the sigma value for this case as 0.8 of the track width (exactly double the one chosen by conventional recording).

Comparing the binary and Multi-Level architectures on the same plot in FIG. 15 quantifies the AD advantages. It shows the SNR at the output of the equalizer for conventional binary system for Du equal to 2 with no jitter and with jitter which has a variance equal to 10% of the bit width at Du equal to 2. On the same plot, Multi-Level architecture is shown operated at different normalized densities. As the track density of the Multi-Level recording is twice the one corresponding to binary system (the head cross track profile sigma for Multi-Level recording is twice the binary case, which implies doubling the track density for the same read-head), the AD of the Multi-Track case for Du equal to 1 is the same as the conventional binary case when Du is set to 2. One can adjust the transition noise amount in the system for Multi-Level case by reducing the percent jitter from 10% to 5% (as Du is now 1 instead of 2, thus bit width is doubled) times square root of 3 (as this reduces the effective track by 3, thus increased the jitter by square root of 3). As can be seen from FIG. 15, the Multi-Level recording exhibits a larger SNR at the output of equalizer compared to the conventional recording at the same areal density. In order to quantify what the excess SNR means in terms of areal density, the linear density is increase in Multi-Level recording until the SNR at the output of the equalizer is close to what is observed with the conventional recording architecture. FIG. 15 shows that when the Du is increased from 1 to 1.2-1.3 then the SNR curves for both Multi-Level and conventional become very close, the linear density 20-30% increases more than with the Multi-Level recording, thus the proposed Multi-Level system case resulting into overall 20%-30% extra areal density advantage for this specific system settings.

The analysis as shown in FIG. 15 is repeated in FIG. 16, this time starting at Du equal to 2.5 for conventional binary recording, and see that the AD gain with Multi-Level architecture now increases to 30% gain from 20%-30% gain.

In the discussion above, the read-head cross track sigma relative to the track width has been optimized, and used that optimized head. The conventional binary system at Du equal to 2 in FIG. 15 and to 2.5 in FIG. 16 has been considered. Then, assuming that is the limit for conventional binary system, the areal density by 20 to 30% is shown to increase if a Multi-Level recording system is used, for example with 4 levels. This time, a read-head is chosen to be wider than the target track density, for example with a sigma equal to exactly the track width, and calculate the track width differences between the conventional and multi-level recording systems as another way of quantifying the areal density advantage to be had with Multi-Level recording.

FIG. 17 shows the SNR at the output of equalizer as a function of input electronic SNR for Multi-Level system with 0 and 10% media transition noise. The conventional binary system equalized SNR can match these equalized SNR levels when the head cross-track sigma and track width ratio can be reduced to 0.65-0.70 levels, which corresponds to having track width to be 1.43 (1/0.70) to 1.54 (1/0.65) times larger than the one in Multi Level system. For the same linear density (i.e., same normalized density Du, chosen to be 2 in this case), the equivalent areal density difference corresponds to track density differences, and in this case, the proposed Multi-Level recording corresponds to 43% to 54% higher areal densities, based on the amount of operating electronic noise and the jitter in the system, than its conventional binary recording counterpart.

Areal density (AD) is increased, especially when the read head cannot be scaled to target track widths for an envisioned AD point. A higher read data rate is achieved. Data sectors are used to estimate head position information, resulting into a high bandwidth servo system and a better format efficiency.

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application for the coherent, shingled media system while maintaining substantially the same functionality without departing from the scope and spirit of the present invention. It will be appreciated by those skilled in the art that the teachings of the present invention can be applied to removable magnetic media, without departing from the scope and spirit of the present invention.

What is claimed is:

1. A data storage system, comprising:
  recording media that includes a shingled track pattern that includes a relatively wider track, and relatively narrower multiple data tracks in which mapped data bits are recorded, the mapped data bits being coherently aligned with one another across the multiple data tracks; and
  a read head having an effective read head width that extends across the multiple data tracks and that is aligned to coherently read the mapped data bits; the read head having a read head output that comprises a non-binary multi-level amplitude summation of the mapped data bits.

2. The data storage system of claim 1, and the read head output further comprises a binary amplitude output from the relatively wider track.

3. The data storage system of claim 1, and the read head simultaneously reads the multiple data tracks in a single pass.

4. The data storage system of claim 3 and the non-uniform read sensitivity profile comprises a Gaussian profile.

5. The data storage system of claim 4 and the read channel further comprises a continuous time filter, an analog-to-digital converter and an equalizer.

6. The data storage system of claim 1, and the read head comprises a non-uniform read sensitivity profile, and the widths of the multiple data tracks are adjusted to compensate the non-uniform read sensitivity profile.

7. The data storage system of claim 1, further comprising:
  a read channel that receives the read head output and that provides an inverse-mapped read channel output that comprises multiple binary data bits that correspond with the recorded mapped data bits.

8. The data storage system of claim 1 wherein the mapped data bits are selected to reduce transition jitter.

9. The data storage system of claim 1 and the reading of the mapped data bits is used to estimate position information.

10. The data storage system of claim 1 wherein the reading of mapped data bits increases the read data rate.

11. A data storage system, comprising:
recording media that includes multiple data tracks in which mapped data bits are recorded, the mapped data bits being coherently aligned with one another across the multiple data tracks; and
a read head having an effective read head width that extends across the multiple data tracks and that is aligned to coherently read data simultaneously from the multiple tracks in a single pass; the read head having a read head output that provides a non-binary multi-level amplitude summation of the simultaneously read data.

12. The data storage system of claim 11, and the read head simultaneously reads the multiple data tracks in a single pass.

13. The data storage system of claim 11, and the read head comprises a non-uniform read sensitivity profile, and the widths of the multiple data tracks are adjusted to compensate the non-uniform read sensitivity profile.

14. The data storage system of claim 13 and the non-uniform read sensitivity profile comprises a Gaussian profile.

15. The data storage system of claim 11, further comprising:
a read channel that receives the read head output and that provides an inverse-mapped read channel output that comprises multiple binary data bits that correspond with the recorded mapped data bits.

16. The data storage system of claim 15 and the read channel further comprises a continuous time filter, an analog-to-digital converter and an equalizer.

17. The data storage system of claim 11 and the shingled track pattern comprises erase bands.

18. A method of data storage, comprising:
recording user data on a shingled track pattern that includes a relatively wider track, and relatively narrower multiple data tracks in which mapped data bits are recorded;
aligning the mapped data bits coherently with one another across the multiple data tracks;
reading the mapped data bits with a read head having an effective read head width that extends across the multiple data tracks; and
aligning the read head to coherently read the mapped data bits to provide a read head output that comprises a non-binary multi-level amplitude summation of the mapped data bits.

19. The method of claim 18, and further comprising:
receiving the read head output at a read channel that provides an inverse-mapped read channel output that comprises multiple binary data bits that correspond with the recorded mapped data bits.

20. The method of claim 18, and further comprising:
providing a non-uniform read head sensitivity profile, and the widths of the multiple data tracks are adjusted to compensate the non-uniform read head sensitivity profile.

* * * * *